United States Patent [19]
Rom

[11] Patent Number: 5,614,942
[45] Date of Patent: Mar. 25, 1997

[54] DEVICE FOR THE CONTROL OF THE SHUTTER OF A CCD CAMERA SUPPLIED WITH LIGHT FROM A LIGHT SOURCE

[75] Inventor: Ole Rom, Bingen, Germany

[73] Assignee: NSM Aktiengesellschaft, Bingen, Germany

[21] Appl. No.: 493,430

[22] Filed: Jun. 22, 1995

Related U.S. Application Data

[63] Continuation of Ser. No. 98,602, Jul. 28, 1993, abandoned.

[30] Foreign Application Priority Data

Jul. 29, 1992 [DE] Germany ............................ 42 25 074.9

[51] Int. Cl.⁶ ............................. H04N 7/18; H04N 5/238
[52] U.S. Cl. ............................. 348/61; 348/207; 348/363; 434/21
[58] Field of Search ........................... 348/61, 207, 363, 348/224, 362, 364; 434/21, 22, 23

[56] References Cited

U.S. PATENT DOCUMENTS

| | | | |
|---|---|---|---|
| 4,137,651 | 2/1979 | Pardes et al. ........................ | 35/25 |
| 4,336,018 | 6/1982 | Marshall et al. ..................... | 434/22 |
| 4,619,616 | 10/1986 | Clarke ................................ | 434/22 |
| 4,629,427 | 12/1986 | Gallagher .......................... | 434/22 |
| 4,744,650 | 5/1988 | Becker et al. ...................... | 352/84 |
| 4,745,608 | 5/1988 | Aulds et al. ........................ | 372/38 |
| 4,793,811 | 12/1988 | Eichweber ......................... | 434/22 |
| 4,824,374 | 4/1989 | Hendry et al. .................... | 434/22 |
| 4,834,945 | 3/1989 | Becker et al. ..................... | 422/68 |
| 5,097,340 | 3/1992 | Tanabe et al. ................. | 358/213.19 |
| 5,215,464 | 6/1993 | Marshall et al. .................. | 434/22 |
| 5,247,367 | 9/1993 | Lee ............................ | 358/213.19 |

FOREIGN PATENT DOCUMENTS

| | | | |
|---|---|---|---|
| 0146466 | 7/1989 | European Pat. Off. ......... | F41G 3/26 |
| 2748993 | 5/1979 | Germany ....................... | F41G 3/26 |
| 3112443 | 2/1983 | Germany ....................... | F41J 5/02 |
| 3523459 | 1/1986 | Germany ....................... | F41J 5/02 |
| 4007759 | 9/1991 | Germany ....................... | F41G 3/26 |
| 2248994 | 4/1992 | United Kingdom ............ | H04N 7/18 |
| 91/09266 | 6/1991 | WIPO ............................ | F41G 3/26 |
| 92/08093 | 5/1992 | WIPO ............................ | F41G 3/26 |

Primary Examiner—Leo Boudreau
Assistant Examiner—Bipin Shalwala
Attorney, Agent, or Firm—Dilworth & Barrese

[57] ABSTRACT

In the case of a device for the control of the shutter of a CCD camera supplied with preferably monochromatic light such as laser light from a light source, and more particularly for the control of the shutter of a CCD camera of a light ray marksmanship system, the CCD camera photographs dots of light produced by a firearm emitting a light ray directed on a reflecting screen or a television screen so that such dots may be evaluated by a computer and displayed. In order ensure that the CCD camera is essentially unaffected by interfering light sources and light from the surroundings, which has the effect of so-called "noise", and is able to respond to the main light ray, on the basis of a start signal the light source produces one or more light pulses and then a main pulse. An optoelectronic receiver is provided, which receives reflected (stray) light signals and passes on corresponding signals to a computer, which from the light pulse or from the decoded sequence of light pulses produces a camera shutter opening signal, which opens the camera shutter for approximately the duration of the main pulse.

18 Claims, 1 Drawing Sheet

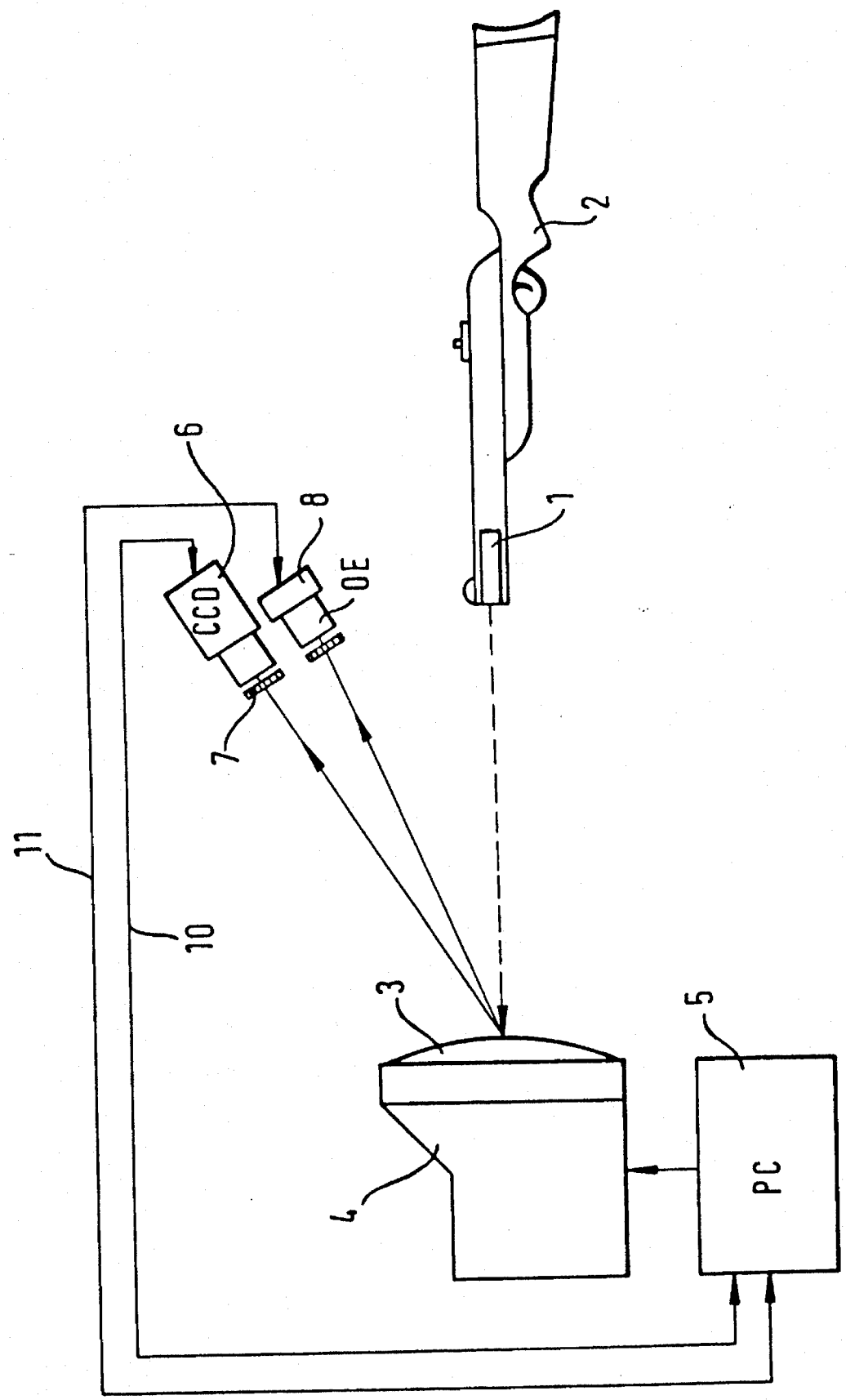

DEVICE FOR THE CONTROL OF THE SHUTTER OF A CCD CAMERA SUPPLIED WITH LIGHT FROM A LIGHT SOURCE

This is a continuation of application Ser. No. 08/098,602 filed on Jul. 28, 1993 now abandoned.

BACKGROUND OF THE INVENTION

The invention relates to a device for the control of the shutter of a CCD camera supplied with preferably monochromatic light such as laser light from a light source, and more particularly for the control of the shutter of a CCD camera of a light ray marksmanship system, in the case of which the CCD camera photographs dots of light produced by a firearm emitting a light ray directed on a reflecting screen or a television screen so that such dots may be evaluated by a computer and displayed.

CCD (charge coupled device) cameras consist of parallel connected CCD line sensors, which constitute a CCD matrix, in the case of which the area to be displayed is divided up so finely that the impression of a continuous image is created. In accordance with the German standard a CCD camera has a rate of 50 images or frames per second, that is to say ½ an image in 20 ms.

CCD cameras are for example employed in light ray marksmanship systems, in the case of which the CCD camera photographs dots of light produced by a light emitting firearm on a reflecting screen or a television screen, which are evaluated by a computer and displayed. Such systems, which mostly operate with infrared light from a laser, have been proposed in the most various different forms, for example in accordance with the German patent publications 2,748,993 A, 3,112,443 A and 3,523,459 A, the European patent publication 146 466 B and the patent publication WO 92/08 093. An infrared laser marksmanship system as described in the patent publication WO 91/09 266 differs from other systems to the extent that the firearm emitting the infrared laser light produces dots on a television screen, on which targets or objects constituting targets may be displayed, the dots of light produced television screen being detected by the evaluating electronic system as hits and being also able to be displayed on the picture screen.

One disadvantage of all known light ray marksmanship systems is that the CCD camera is sensitive to interference in the form of light from the surroundings, which even in the case of operation with infrared laser light rays can not be completely prevented by using an infrared input filter, which is essentially only transparent for infrared light and cuts out visible light.

SUMMARY OF THE INVENTION

One object of the present invention is to provide a device of the type initially mentioned, in the case of which the CCD camera while being essentially unaffected by interfering light sources and light from the surroundings, which has the effect of so-called "noise", is able to respond to the main light ray.

In accordance with the invention this object is to be achieved in the case of a device of the sort noted initially, since on the basis of a start signal the light source produces one or more light pulses and then a main pulse, an optoelectronic receiver (OE) is provided, which receives reflected (stray) light signals and passes on corresponding signals to a computer, which from the light pulse or from the decoded sequence of light pulses produces a camera shutter opening signal, which opens the camera shutter for approximately the duration of the main pulse. With the device in accordance with the invention it is possible to ensure that the CCD camera only essentially receives the main pulse with the exclusion of noise resulting from any interfering light source, registers the main light pulse and passes on a corresponding signal to the electronic signal processing system. In this respect it is possible for the main pulse to be made so brief that during its duration, during the time in which the shutter is opened, it is of such a high intensity that the effect of interfering light sources is negligible.

It is convenient if the light source is an infrared light source. In accordance with a preferred working embodiment there is the provision that the light source is a laser light source and is more particularly an infrared laser light source, preferably in the form of a laser diode (semiconductor laser).

The British patent publication 2,248,994 A discloses an observation system for the recognition of motor vehicle number plates in the dark, in the case of which a CCD camera is connected by an electric cable with a light source in the form of infrared laser diodes, the camera being so controlled through the cable that during an opening time of the shutter of approximately one mS it receives the part of the laser light pulse with the highest energy. This known system is practically free of effects produced by extraneous light sources, for example the headlights of the vehicle whose number plate is to be recognized, because the shutter of the CCD camera is not open for the full time of half an image or frame of 20 mS but only for a few mS. This renders it possible to prevent the computer from being saturated outside the brief opening time of the shutter by extraneous light sources, in such a manner that the main light pulse is not recognized and registered in the desired manner. The disadvantage of this known system is however that the laser light source is connected by a cable with the CCD camera, something that is undesired and in many cases is not acceptable. For instance it is undesirable for a firearm in a light ray marksmanship system comprising a light source, preferably in the form of a red light laser diode, to be connected with a cable which impairs normal handling of the weapon. The control of the camera shutter in accordance with the invention by light pulses produced and caused to shine prior to the main light pulse and which serve for the control therefore renders possible an improved and more extensive use of the known shutter control for a CCD camera.

In accordance with a further advantageous development of the invention the camera shutter opening signal is controlled by a sequence of light pulses, in which additional information is encoded. The individual light pulses of the sequence are preferably in the microsecond range, whereas the main pulse is of the order of some mS. The individual light pulses of the sequence of light pulse may with advantage be in a range of 10 to 100 microseconds.

Between a preceding sequence of light pulses and the main pulse of preferably 1 mS there is preferably an interval of 1 mS.

An other advantageous feature of the invention is such that the sequence of light pulses contains information about the light source emitting such sequence, for example one of a number of firearms having laser diodes and/or the inclination to the horizontal (horizontal position) of the firearms comprising the laser diodes and/or the state of charge of the batteries employed for supplying the light source.

BRIEF DESCRIPTION OF THE DRAWINGS

One working embodiment of the invention will now be described in more detail in the following with reference to the drawing, in whose single FIGURE the preferred field of application of the invention to a light ray marksmanship system is diagrammatically depicted.

DESCRIPTION OF THE PREFERRED EMBODIMENTS

The laser light source 1 supplied from a battery is arranged in a firearm 2 corresponding to a familiar sporting rifle. The laser light source consists of an infrared laser diode (semiconductor diode), which is arranged in a sleeve-like container together with the input optical system (a collimator) and the control electronic circuitry. As regards details of the sleeve containing the laser light source in the barrel of a firearm reference may be had for example to FIG. 2 of the said patent publication WO 92/08 093 and the accompanying description.

Using the laser it is possible to shoot at the television picture screen 3 of a monitor 4. The monitor 4 is connected in a conventional manner with a computer, preferably a PC 5, which produces images of targets on the television picture screen 3 in the desired manner. The images may be stationary images or moving ones.

A CCD camera 6 is directed towards the picture screen 3 and has an optical band pass filter 7 in front of its optical system, the pass band of the filter being sufficiently narrow to allow passage of the laser light while suppressing light with other frequencies with the result that the signal to noise ratio may be optimized while taking the wavelength into account.

Adjacent to the CCD camera 6 there is an optoelectronic receiver (OE) 8 which is responsive to the infrared light reflected at the television picture screen 3.

Both the CCD camera 6 as well as the OE 8 are connected by leads 10 and 11 with the PC 5.

If the trigger of the firearm 2 is pulled, the laser light source 1 will firstly emit a start sequence of light pulses, which may for instance amount to 60 microseconds. Following this a sequence of laser pulses in the microsecond range may be emitted, which contains information as to which of a number firearms present is being fired for the identification thereof.

The following pulses may contain information as to whether the firearm was tilted, for example for the purpose of reloading. In order to detect slanting of the firearm it is possible to employ a mercury-silver inclination sensor.

Further pulses may serve to monitor the battery, for instance in order to indicate the condition of charge.

Furthermore the initial or preceding pulses may have any desired further information in an encoded form. Such encoding is preferably performed in a conventional manner with a bit pattern.

The initial pulses are received by the OE 8 and then decoded in the PC 5. Such decoding leads to the production of an open signal for the CCD camera 6, which causes the shutter of this camera to be opened for the duration of the main pulse of, for example, 1 mS. The CCD camera then detects the dot of light produced by the main pulse on the television picture screen 3 with the correct position or angle and passes on the coordinates thereof to the PC 5, in which the coordinates are evaluated and an image of the hit is produced, which is then presented on the monitor 3 in the correct position, for example as a hit hole and is caused to appear over the preceding hits.

The above described invention is consequently characterized in that a source of infrared laser light is directed towards a defined reflecting surface. After operation of the trigger of the firearm the light source emits a sequence of infrared light signals, which are reflected by the reflecting surface and are received by the OE and the CCD camera. The CCD camera detects the projected dot of light, while the OE responds to the stray infrared light, whose intensity exceeds a certain threshold. The encoding of the light pulse sequence renders it possible to employ the signals received by the OE for the control of the opening time of the CCD camera and for the recognition of the information encoded in the signal. Both in the OE and furthermore in the CCD camera optical filters are integrated, which essentially only allow passage of infrared light of that frequency, which corresponds to the frequency produced by the laser. The invention hence renders possible the transmission of information by the laser light source, whose reception by the CCD camera is substantially free of interference by the effect of extraneous light.

The invention may with particular advantage be applied to computer games and training system and more particularly to simulation system for target practice.

The invention may also be applied with particular advantage to systems in which a firearm is used to shoot at animation sequences with a battery powered laser light on a computer monitor, a CCD camera detecting the reflection.

Laser light and more particularly laser light in the infrared range of the spectrum, has to be energy-limited owing to possible danger to the human eye. Furthermore it is necessary for the laser light source to be supplied from a battery so that a cable, which would be inconvenient, does not have to be connected with the firearm. For this reason it is necessary for the laser ray to be limited to a pulse duration of less than, for example, 1 mS, since the required quantity of energy per shot is reduced.

CCD cameras with a shutter opening time of approximately twenty times the duration of the laser pulse of one mS are very sensitive to light from other sources such as the sun, halogen lamps etc. Although the intensity of this undesired interfering light is less than that of laser light, the overall quantity of the energy absorbed during reception of half an image (20 mS) is sufficient in order to substantially outweigh the light received from the laser light source or even to cancel it out. The system in accordance with the invention makes it possible to transmit the desired information and more particularly furthermore the main pulse in a reliably detectable manner with a favorable signal to noise ratio.

In accordance with the system of the invention after operation of the trigger an encoded light pulse sequence is transmitted from the laser light source to the target area, is reflected thereby and is received by the OE, which passes on the information contained in the light pulses and furthermore the position of the hit to the PC.

In accordance with the invention the favorable signal to noise ratio is made possible because the CCD camera only receives the main laser light pulse for a time of approximately one mS, that is to say during a time, which corresponds to only a twentieth of the half image time of the CCD camera.

In the system in accordance with the invention therefore operation of the trigger of the firearm means that a sequence of laser light pulses as information carriers will be directed at the target area, such sequence being followed by the main light pulse of approximately one mS. The reflected signal is received by the OE and the information contained in the light pulse sequence is decoded. If a valid signal is recognized, the shutter of the CCD camera is opened for a time of approximately 1 mS. The emission of the individual light pulse following the sequence of one mS in duration is therefore synchronized and is received by the camera exactly during opening time of the shutter of the CCD camera.

I claim:

1. A device for the control of the shutter of a CCD camera supplied with light in a light ray marksmanship system, in order for the CCD camera to receive a main pulse of light from a light source unaffected by unwanted signals, comprising the combination of the CCD camera having a shutter, said light source comprising a firearm emitting a light ray and arranged to produce one or more light pulses as a starting signal and then a main pulse based upon the starting signal, a reflecting or television screen upon which the light ray emitted by the firearm is directed and, in turn, providing dots of light which the CCD camera is arranged to photograph, an optoelectronic receiver arranged to receive and pass on said starting signal, and a computer arranged to receive said starting signal and which, from said starting signal, produces a camera shutter opening signal, which opens the camera shutter for approximately the duration of the main pulse, said computer also arranged to evaluate the dots of light which the CCD camera photographs, wherein said light source is not coupled to any of the CCD camera, optoelectronic receiver and computer.

2. The device as claimed in claim 1, characterized in that the light source is an infrared light source.

3. The device as claimed in claim 1, additionally comprising an optical band pass filter arranged on the input side of the optical system of the CCD camera, the pass band of such filter being sufficiently narrow to allow passage of laser light and to cut out light with other frequencies, whereby signal to noise ratio is optimized for a particular wavelength of light.

4. The device as claimed in claim 1, characterized in that the light source is a laser light source.

5. The device as claimed in claim 4, characterized in that the light source is a laser diode (semiconductor diode).

6. The device as claimed in claim 1, additionally comprising means for controlling the camera shutter opening signal by a sequence of light pulses in which additional information is encoded.

7. The device as claimed in claim 6, characterized in that the light source is arranged to provide the sequence of light pulses with information regarding the light source emitting such pulses.

8. The device as claimed in claim 1, characterized in that the light source is arranged to emit a sequence of initial pulses comprising a bit pattern in the microsecond range and the main pulse of approximately one mS duration.

9. The device of claim 1, wherein the light source is arranged to emit monochromatic light.

10. The device of claim 2, wherein the light source is a laser light source.

11. The device of claim 1, additionally comprising means for controlling the camera shutter opening signal by a sequence of light pulses in which additional information is encoded, and the light source is arranged to provide the sequence of light pulses with information regarding at least one of identification of one of a plurality of firearms respectively comprising laser diodes, horizontal positioning of a respective firearm and state of charging of a battery supplying the light source.

12. The device of claim 1, wherein the computer is coupled to both the CCD camera and optoelectronic receiver.

13. The device of claim 1, wherein the computer is coupled to both the CCD camera and optoelectronic receiver and is additionally coupled to the screen to present evaluation of the main pulse thereon.

14. The device of claim 10, additionally comprising optical filters of the CCD camera and optoelectronic receiver being integrated to essentially allow only passage of infrared light corresponding to frequencies of laser light produced by the light source.

15. The device of claim 1, wherein the light source is arranged to produce the main pulse of intensity sufficiently high and brief so that effect of interfering light is negligible.

16. The device of claim 8, wherein the microsecond range is 10–100 microseconds.

17. The device of claim 16, wherein the light source is additionally arranged to provide an interval of one mS between termination of the sequence of initial pulses and emission of the main pulse.

18. The device of claim 8, wherein the shutter of the CCD camera is arranged to be opened for approximately one mS which is one twentieth of half image time of the CCD camera.

* * * * *